United States Patent [19]

Trombly

[11] 4,207,555

[45] Jun. 10, 1980

[54] LOCK SYSTEM

[75] Inventor: John E. Trombly, Winchester, Mass.

[73] Assignee: The Eastern Company, Naugatuck, Conn.

[21] Appl. No.: 883,204

[22] Filed: Mar. 3, 1978

[51] Int. Cl.[2] ........................ H04Q 3/00; E05B 49/00

[52] U.S. Cl. ........................ 340/147 MD; 340/147 R; 361/172

[58] Field of Search ....... 340/147 MD, 149 R, 149 A, 340/164 R; 361/172

[56] References Cited

U.S. PATENT DOCUMENTS

| | | | |
|---|---|---|---|
| Re. 29,259 | 6/1977 | Sabsay | 340/149 A |
| 3,800,284 | 3/1974 | Zucker et al. | 340/149 R |
| 3,859,634 | 1/1975 | Perron et al. | 340/149 A |
| 3,944,976 | 3/1976 | France | 340/149 A |
| 4,031,434 | 6/1977 | Perron | 361/172 |

*Primary Examiner*—Donald J. Yusko
*Attorney, Agent, or Firm*—Wegner, Stellman, McCord, Wiles & Wood

[57] ABSTRACT

An electronic lock system including a key coder, a key or set of keys and a lock or set of locks. The key coder provides an operator-selectable key code having a new code portion and current code portion to each key. The key receives the selected key code from the key coder and retains it for use with the lock or set of locks, one at a time. When the lock receives the key code from the key, a comparison is made in the lock between the current code portion of the key code and a lock code contained within a memory in the lock. If the current code portion of the key code compares the lock code, the lock is actuated and the lock code in the memory is replaced by the new code portion of the key code. If the new code portion of the key code is identical to the current code portion of the key code, the key will actuate the lock and will continue to do so until the lock is once actuated by a key having a different new code portion of the key code. Thereafter, the remaining keys in the set will not actuate the lock until their key code is changed by the key coder.

7 Claims, 7 Drawing Figures

LOCK SYSTEM

BACKGROUND OF THE INVENTION

This invention relates to systems responsive to the reception of an appropriate code and, more particularly, to lock systems.

It is often required that a lock or set of locks be rekeyed or changed after a period of time or upon the happening of an event. Rekeying or changing locks can be time-consuming and expensive. Moreover, it is sometimes desirable that the person possessing the key not be aware of the key code carried by the key.

SUMMARY OF THE INVENTION

In accordance with the present invention, an electronic lock system provides simple, quick and inexpensive rekeying of a lock or set of locks by the use of a key. The lock system includes a key coder, the key or set of keys and the lock or set of locks. The keys receive a key code having a new code portion and a current code portion from the key coder. If the current code portion of the key code compares with the lock code, the lock is actuated and the lock code in the memory is replaced by the new code portion of the key code. The operator need not be aware of the code carried by the key. If the keys are provided with a similar key code wherein the current code portion and the new code portion are identical and correspond to a lock code retained within the lock, the keys will actuate the lock. Once a lock is actuated by a key having a key code with a different new code portion, the lock code in that lock is changed, thereafter rendering the remaining keys in the set incapable of actuating the lock. The remaining keys can be provided with another key code having a different new code portion so that they will again be capable of actuating the lock or set of locks.

DRAWING

DESCRIPTION OF THE PREFERRED EMBODIMENT

Figure 1:
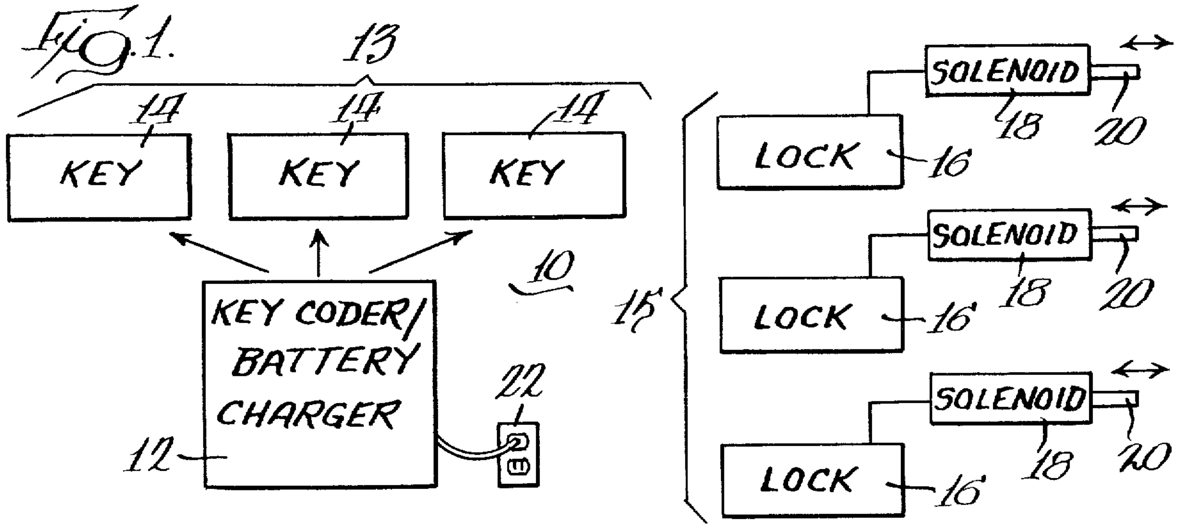
FIG. 1 is a block diagram of the key coder/battery charger, a set of keys and a set of locks forming the lock system of the present invention.

Referring to FIG. 1, the lock system 10 includes a key coder/battery charger 12, a set 13 of a key or similar keys 14 and a set 15 of a lock or similar locks 16. When a lock is actuated, solenoid 18 withdraws bolt 20 to unlock a door, for example. Although the following discussion will be directed primarily to a lock system, it is apparent that the principles of the invention apply to any system which is to be actuated (as by opening or closing the contacts of a switch) in response to the reception of an appropriate code.

Key coder/battery charger 12 receives power from outlet 22 and is located in a secure area wherein accessibility to it is restricted to authorized persons. The key coder/battery charger 12 stores an operator- or computer-selected key code which is transferred to key 14 when each is brought into contact with or inserted into key coder/battery charger 12. If key 14 is electronic, as of the type to be described, sufficient energy is provided by key coder/battery charger 12 to charge the battery (not shown) in each key 14 when the key code is transferred to the key.

Key 14 accepts and retains a key code from key coder/battery charger 12 and provides the key code to lock 16 when brought into contact with or inserted into lock 16. If the key 14 and the lock 16 are electronic, as of the type to be described, power from the key coder/battery charger 12 may be stored in key 14 which in turn provides energy to the batteries (not shown) in the lock 16 when the key code is transferred to lock 16.

Locks 16 are of similar construction and form the set 15 having any number. A memory in each lock stores a lock code. Lock 16 is responsive to a key code having a current code portion and a new code portion. When the current code portion of the key code from key 14 corresponds to the lock code, and the key 14 is brought into contact with or inserted into lock 16, its solenoid 18 is actuated, withdrawing bolt 20. Upon the actuation of each of the locks 16, the new code portion of the key code replaces the lock code in the memory of the lock so actuated, thereby rekeying the lock.

Figure 2:
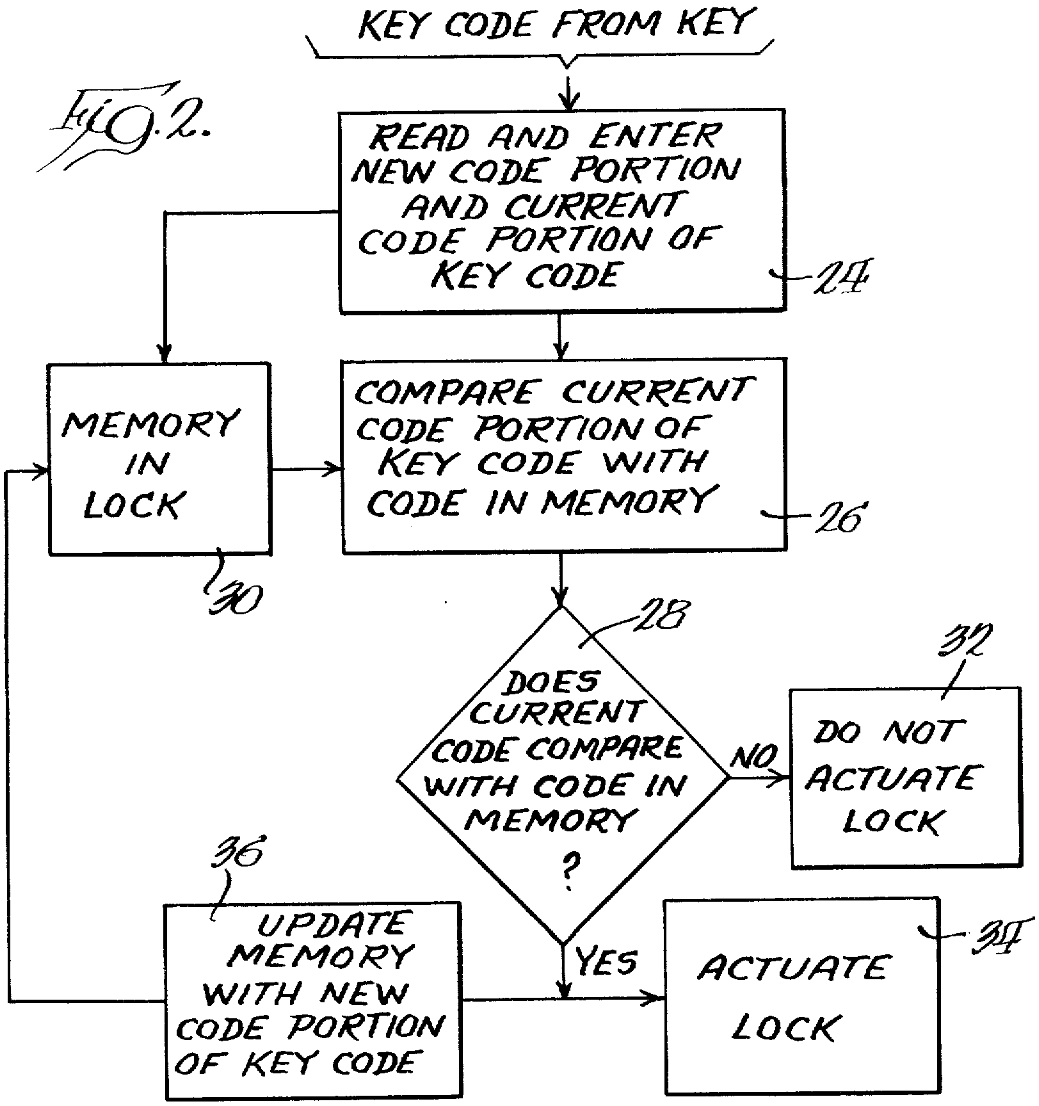
FIG. 2 is a flow chart of the logical operations of each lock of FIG. 1 when the lock receives a key code from a key.

Referring to FIG. 2, the logical operation of the lock 16, adapted to receive a key code having a new code portion and a current code portion, will be explained. When key 14 is placed adjacent or inserted into lock 16, the key code is read and entered as represented by block 24. After the new code portion and the current code portion are entered, a comparison is made between the current code portion of the key code and a lock code contained in a memory of the lock as represented by blocks 26 and 28. The lock code contained within the memory in the lock is represented by block 30.

If the current code portion of the key code does not correspond to the lock code in the memory in the lock, the lock is not actuated, as represented by block 32.

If the current code portion of the key code corresponds with the code in the memory in the lock, the lock is actuated as shown at block 34, and a signal is provided from block 36 to update the memory with the new code portion of the key code from block 24. Thus, the lock code in the memory of the lock is replaced by the new code portion of the key code.

If each key of the set 13 has a key code wherein the new code portion is identical to the current code portion, the lock will receive the current code each time the lock is actuated. Each key of the set will actuate the lock and change the memory in the lock to the current code so that when a key code from another key in the set 13 is entered and read, the current code portion of the key code compares with the previously received current code in the memory in the lock, causing the lock to again be actuated.

However, once any one of the locks 16 is actuated by a key having a key code with the same current code portion but a different new code portion, the new code will be stored in the memory of the lock. Thereafter, the remaining keys 14 in the set 13 will no longer actuate a lock 16 which was once actuated by a key having the different new code portion of the key code since the lock code in the memory in that lock no longer corresponds to the current code portion of the key code. The key codes of the remaining keys 14 in the set 13 must be provided with the different new code portion before the keys will actuate the lock 16. Specifically, the current code portion of the key code must be changed so that it is the same as the different new code portion of the key code which last actuated the lock. If the new code portion of the key code is also the same as the different new code, each key in the set of keys will actuate the lock and will continue to do so until yet another key code once actuates the lock, as discussed above.

The following example may be helpful in the understanding of the operation of the lock system 10. An employer has several employees, each of whom has a key 14 that opens the locks 16 at the office. The employment of one employee is terminated and he does not return his key 14 to the employer. The employer desires that the terminated employee not have access to the office. The employer goes to key coder/battery charger 12 located in a secure area, and selects an updated new code portion of the key code. He then updates his key 14 with the updated new code portion of the key code. He then actuates locks 16 with the key containing the new key code, thereby changing the lock code in the memory of the key so actuated. The employer later returns to key coder/battery charger 12 and changes the current code portion of the key code so that it is identical to the updated new code portion of the key code. The remaining employees are requested to update their keys 14 with the key code from key coder/battery charger 12. Each key having the updated key code will actuate and continue to actuate the lock as described above. However, the key possessed by the terminated employee will not actuate locks 16 since his key has not been updated by key coder/battery charger 12.

Figure 3:
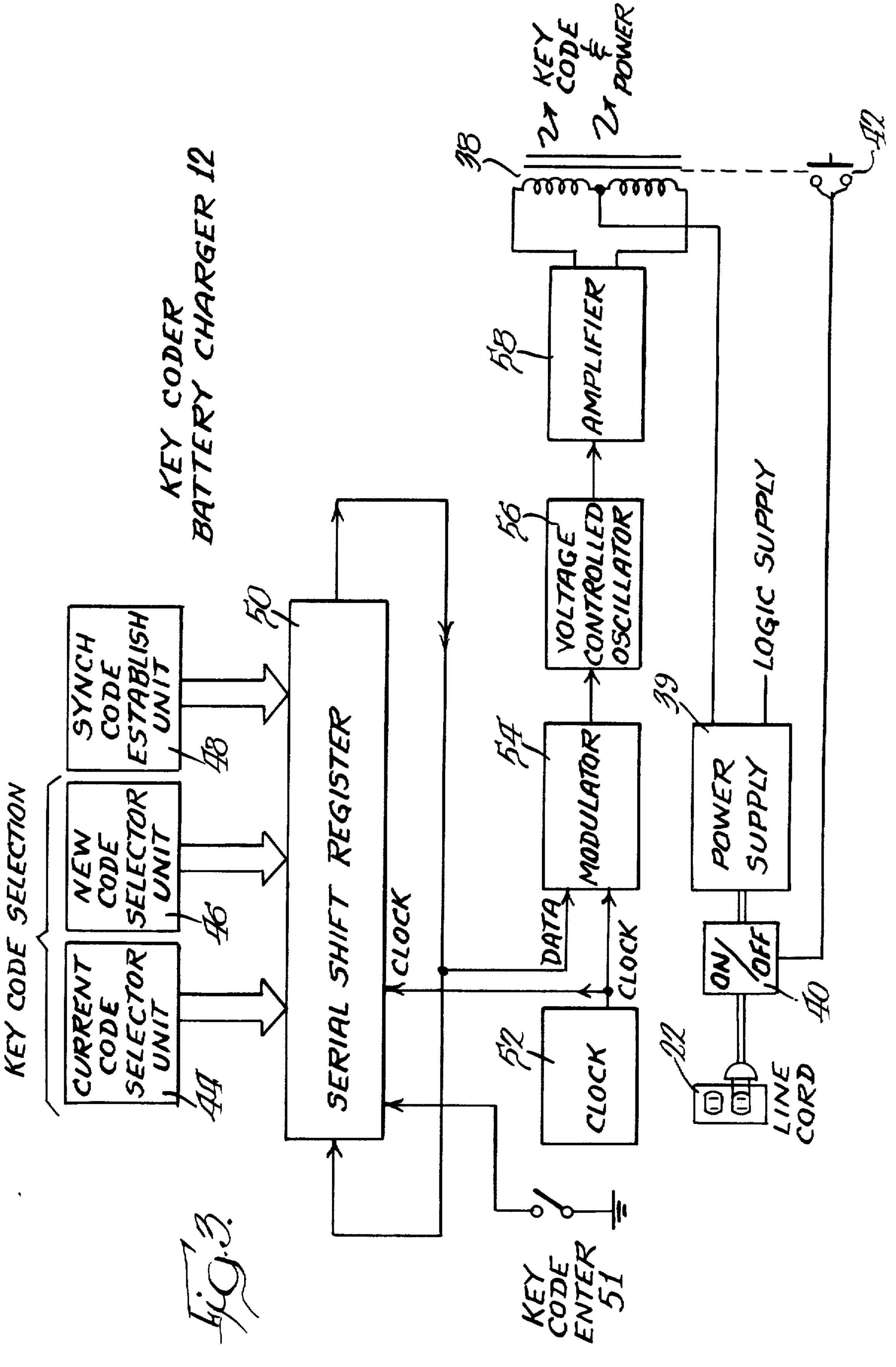
FIG. 3 is a block diagram of an embodiment of the key coder/battery charger shown in FIG. 1.

Referring to FIG. 3, the preferred form of the key coder/battery charger 12 is shown in block diagram. The key coder/battery charger 12 is provided with power from outlet 22, as discussed above. The key coder/battery charger 12 provides key 14 with a self-synchronizing key code and with power through transformer 38, as will be discussed in detail below. The key 14 receives the key code and the power from transformer 38 when they are placed adjacent transformer 38. The power to power supply 39 from outlet 22 may be controlled through ON/OFF switch 40 which is actuated by a weight-responsive switch 42 that closes when the key is adjacent transformer 38.

Key code selection is provided by current code selector unit 44 and new code selector unit 46. The current code selector unit 44 and the new code selector unit 46 establish binary words of equal length. The current code selector unit 44 and the new code selector unit 46 represent manually selectable switches for entering the binary codes manually, or a computer capable of generating a random code for higher security.

Figure 4:
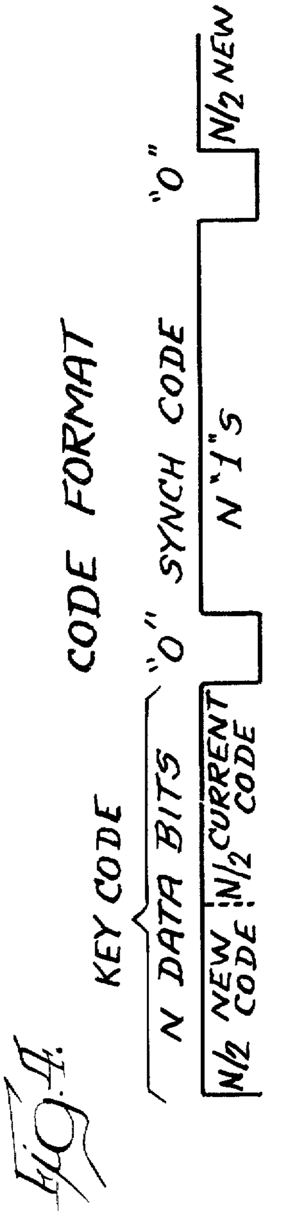
FIG. 4 shows the format of a self-synchronizing code employed in the lock system.

The key code of N bits having a new code portion (N/2 bits) and a current code portion (N/2 bits) and a synch code (N bits) form a self-synchronizing key code having a format shown in FIG. 4. The synch code, which may consist of a plurality of binary "1's," forms a word having a length equal to the key code and is separated from the key code by a binary "0."

Returning to FIG. 3, current code selector unit 44, new code selector unit 46 and synch code establish unit 48 are coupled to serial shift register 50 for establishing the self-synchronizing code format as shown in FIG. 4. Alternatively, the synch code can be directly programmed into serial shift register 50.

The key code from current code selector unit 44 and new code selector unit 46 are loaded into shift register 50 by momentarily depressing the key code enter switch 51. Thereafter, the self-synchronizing key code is clocked out of the shift register 50 by clock 52. The output of serial shift register 50 is coupled to the input thereof so that the code is repetitively circulated from the output of the serial shift register 50 to the input and back through the serial shift register as the clock pulses are received from clock 52.

Figure 5:
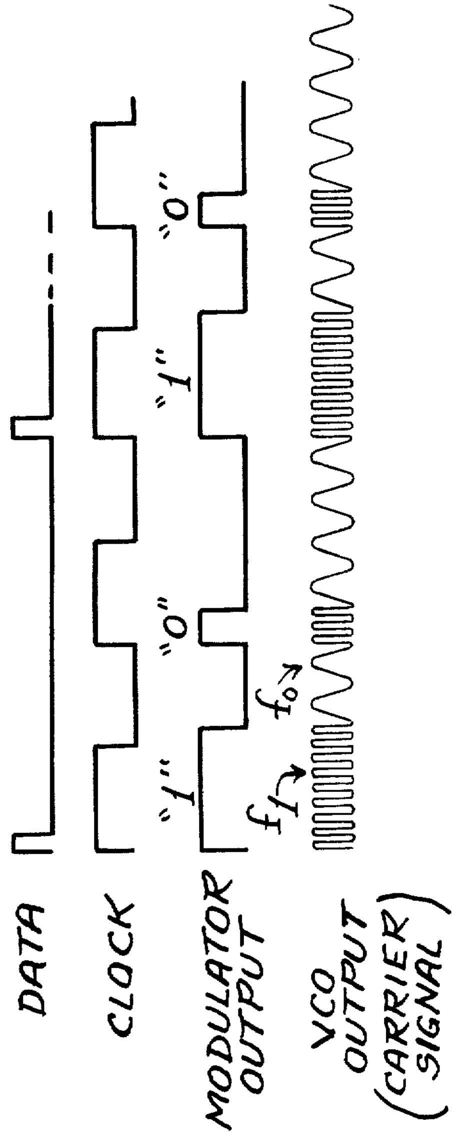
FIG. 5 shows several waveforms helpful in the explanation of the self-synchronizing code and the lock system.

The self-synchronizing key code (data) from the serial shift register 50 and the clock pulses are applied to modulator 54 (see FIG. 5). The output of modulator 54 is a pulse width modulated signal formed from a series of pulses wherein the pulse width of each pulse is dependent upon the binary value of the data at the rising edge of the clock pulses from clock 52. Specifically, if a data bit is a "0" and therefore not present at the rising edge of the clock pulse, the output from modulator 54 is a pulse having a width less than the width of the clock pulse. Similarly, if a data bit is a "1" at the occurrence of the leading edge of the clock pulse, the output of modulator 54 is a pulse having a width greater than the width of the clock pulse.

The output of modulator 54 is applied to a voltage-controlled oscillator 56. The voltage-controlled oscillator 56 provides a carrier signal, the frequency of which is dependent upon the amplitude of the signal from modulator 54. As seen in FIG. 5, for example, the carrier signal has a frequency of $f_1$ when the signal from modulator 54 is "1" and a frequency of $f_0$ when the signal from modulator 54 is "0."

The output from the voltage-controlled oscillator 56 is applied tc inductor 38 through amplifier 58.

Figure 6:
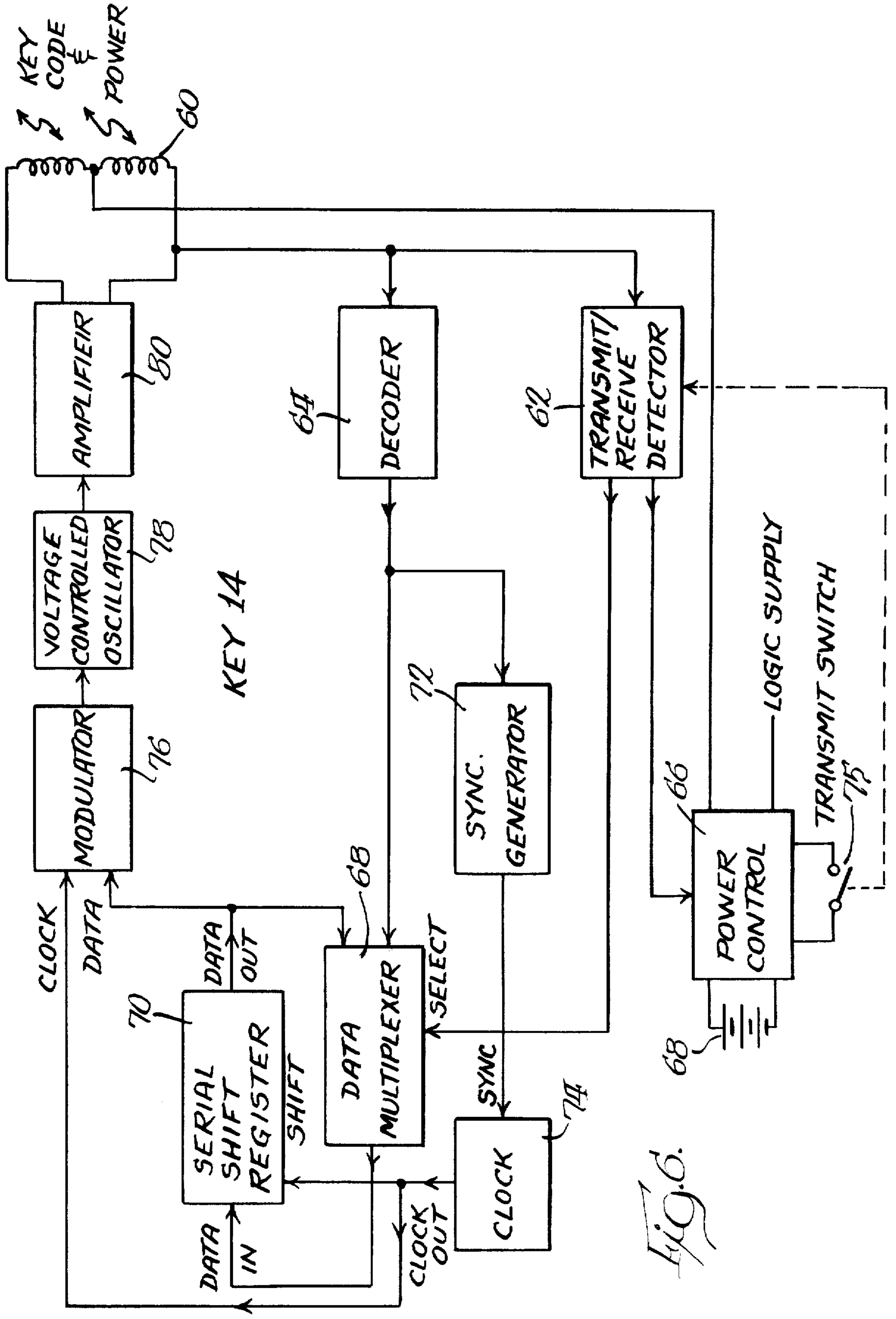
FIG. 6 is a block diagram of an embodiment of a key shown in FIG. 1.

Referring to FIG. 6, a key 14 is shown in block diagram form and is adapted to accept and provide the carrier signal representing the key code through inductor 60. Inductor 60 is adapted to interface with inductor 38 of the key coder/battery charger 12 and an inductor of the locks 16.

The key 14 receives the carrier signal from key coder/battery charger 12. The carrier signal provides the key code and power to key 14. When a carrier signal is received from key coder/battery charger 12 by inductor 60, it is applied to transmit/receive detector 62 and decoder 64. A signal from transmit/receive detector 62 is applied to power control 66 for recharging battery 68. Power control 66 also provides power at the appropriate voltage for the internal circuitry of the key.

Decoder 64 provides a pulse width modulated waveform in response to the frequency of the carrier signal. The modulated waveform is applied to data multiplexer 68 and synch generator 72. Synch generator 72 detects the beginning of each data bit and provides a synch pulse to a clock 74 (having the same frequency as the clock 52 in key coder/battery charger 12) to synchronize the phase of the key's clock with the key coder's clock. Sampling of the data bits takes place on the trailing edge of the clock pulses, and the new code portion and the current code portion of the key code are clocked into serial shift register 50 through data multiplexer 68.

When the key 14 is to transmit the self-synchronizing key code to a lock 16, transmit switch 75 is depressed and transmit/receive detector 62 inhibits data multiplexer 68 from receiving data from decoder 64. Clock 74 runs asynchronously during transmit for clocking the data through serial shift register 70. The output of serial shift register 70 is coupled to the input thereof through multiplexer 68 so that the self-synchronizing code is repetitively circulated through serial shift register 70.

The self-synchronizing key code (data) from serial shift register 70 and the clock pulses from clock 74 are applied to modulator 76 which is activated only during transmit. The output of modulator 76 is provided to voltage-controlled oscillator 78 to provide the carrier signal in a manner identical to that described above with respect to the key coder/battery charger 12. The carrier signal is applied to inductor 60 through amplifier 80.

Figure 7:
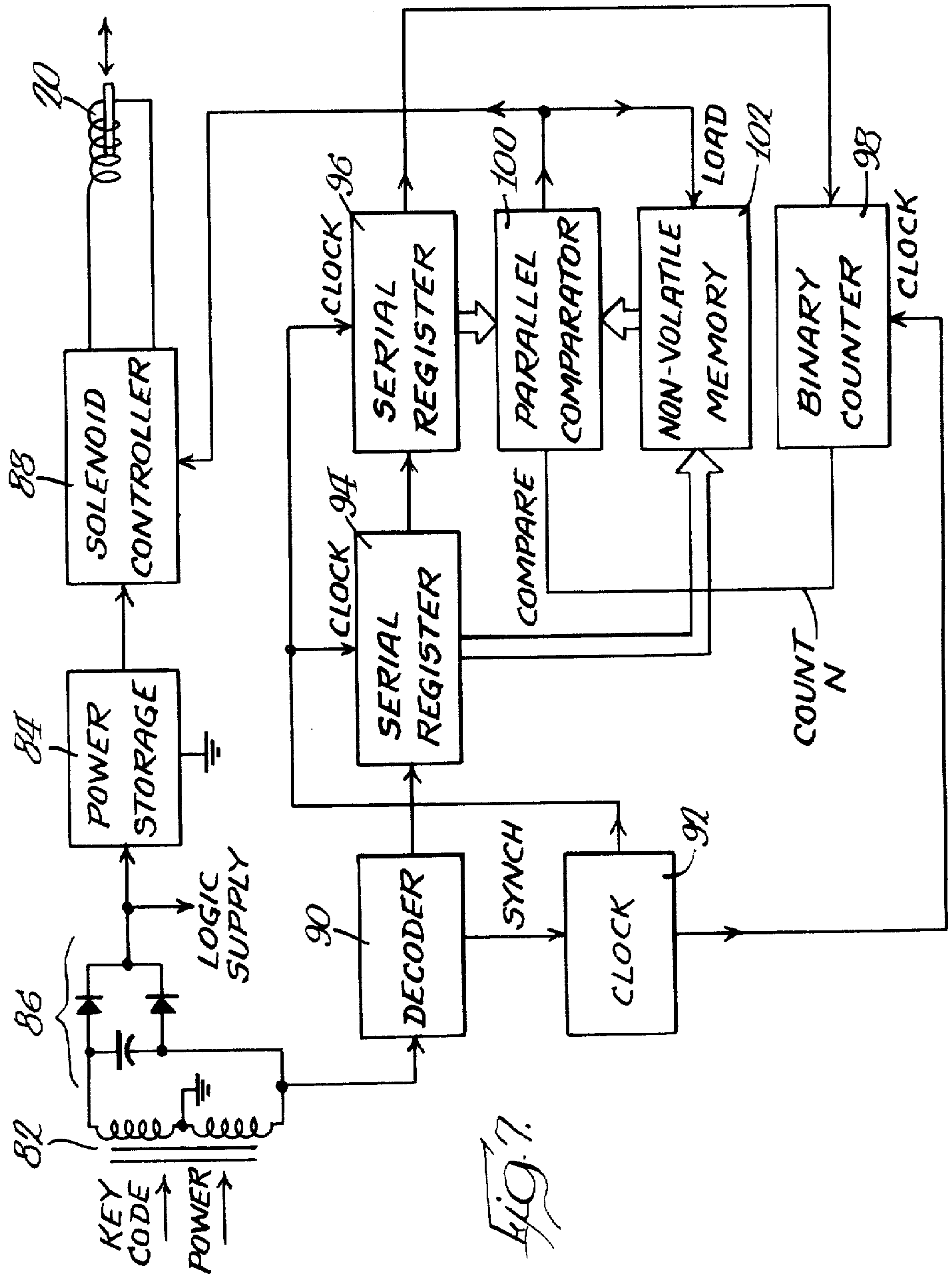
FIG. 7 is a block diagram of an embodiment of a lock shown in FIG. 1.

Referring to FIG. 7, the preferred form of lock 16 is shown in block diagram form. A carrier signal from the key is received by inductor 82. Inductor 82 is coupled to a power storage circuit 84 through a rectifier 86. The energy from the carrier signal provides a logic supply voltage and power to solenoid controller 88 for actuating solenoid 20. The information from the carrier signal is deciphered by decoder 90. A synch pulse is provided to clock 92 by decoder 90 at the beginning of each data bit. These pulses clock the key code into the serial shift registers 94 and 96 at a frequency equal to the clock frequency of clocks 52 and 74 in the key coder/battery charger 12 and key 14, respectively.

The data is sampled on the trailing edge of the clock pulse and the new code portion of the key code is retained in serial shift register 94 and the current code portion of the key code is retained within serial shift register 96. Binary counter 98 counts the number of sequential "1's" from shift register 94 and provides an output pulse when the new code and the current code (totaling N bits) have been received by serial shift registers 94 and 96. The pulse from binary counter 98 is applied to parallel comparator 100 to effect a comparison of the current code in serial register 96 with a lock code in a nonvolatile memory 102. After the comparison is made, binary counter 98 is reset.

If the lock code in the nonvolatile memory 102 compares to the current code from serial shift register 96, a lock-actuating signal is provided to solenoid controller 88 and to nonvolatile memory 102 to enable it to receive the new code portion of the key code from serial shift register 94 to replace the lock code.

It is apparent that a key, as described above, is capable of updating another key with an updated key code. In some instances this may be desirable. However, if it is desired that only the key coder/battery charger 12 be capable of updating key 14, the power level of the key code from the key coder/battery charger 12 can be selected at a level different from the power level of the key code from the key. Transmit receive detector 62 in key 14 could, therefore, discriminate between the different levels.

I claim:

1. A lock system comprising:
  - a key carrying a key code having a new code portion and a current code portion and;
  - a lock adapted to accept the key and having means for receiving the key code from the key;
  - means for retaining a lock code;
  - means for comparing the lock code to the current code portion of the key code each time the key is accepted by the lock;
  - means for actuating the lock if said lock code compares with the current code portion of the key code; and
  - means for providing said means for retaining a lock code with said new code portion of the key code each time the lock is actuated.

2. The lock system of claim 1 further including a key coder for reprogramming a key by replacing the new code portion and current code portion of the key code.

3. A lock adapted to accept a key code providing energy and information in the form of a new code portion and a current code portion, comprising:
  - means for receiving the key code;
  - decoding means coupled to said means for receiving the key code for providing a word representative of said new code portion of said key code and a word representative of said current code portion of said key code;
  - means coupled to said decoding means for retaining said word representative of said new code;
  - means coupled to said decoding means for retaining said word representative of said current code;
  - memory means coupled to said means for retaining said word representative of said new code for retaining a word representative of a lock code and for replacing said lock code with said new code in response to an enable signal; and
  - a comparator coupled to said means for retaining said current code and said memory means for comparing the word representative of the current code with the word representative of the lock code each time the key code is accepted by the lock and generating said enable signal and actuating the lock only if the word representative of the current code compares with the word representative of the lock code.

4. A key for accepting and providing a key code in the form of a modulated sine wave, having a new code portion and a current code portion comprising:
  - interface means for accepting and providing the key code;
  - decoder means coupled to said interface means for providing a first data word representative of the new code and a second data word representative of the current code; and
  - memory means coupled to the decoder means for retaining the first and second data words;
  - means coupled to the interface means and to the memory means for converting the first and second data word into the new code and the current code, thereby forming the key code; and
  - means for selecting whether said key accepts or provides the key code.

5. The key of claim 4 wherein said means for selecting whether said key accepts or provides the key code is responsive to an operator-actuated switch.

6. The key of claim 4 wherein said means for selecting whether said key accepts or provides the key code includes:
  - a transmit/receive detector means for detecting if said key is to accept or provide the key code;
  - a data multiplexer, responsive to the transmit/receive detector and coupled to said memory means and to said decoder means for selecting whether said memory means receives said first and second data words from said decoder.

7. A lock adapted to accept a key carrying a key code having a new code portion, a current code portion, and a synch code portion comprising:

detecting means for detecting the key code;

decoding means coupled to the detecting means for decoding the key code and providing data words representative of the new code portion, the current code portion and the synch code portion;

clock means coupled to the decoding means for providing clock pulses in accordance with the synch code portion;

means coupled to said clock means for providing a compare signal after the data words representative of the new code and the current code have been received;

means coupled to said decoding means and responsive to the clock pulses for receiving and retaining the data word representative of the new code;

means coupled to said decoding means and responsive to the clock pulses for receiving and retaining the data word representative of the current code;

memory means for retaining a data word representative of a lock code and coupled to said means for receiving and retaining the data representative of the new code;

comparing means coupled to the memory means and to said means for receiving and retaining the data word representative of the current code for comparing the data word representative of the lock code to the data word representative of the current code and providing a lock-actuating signal in response to said compare signal;

means responsive to said lock-actuating signal for causing said memory means to replace said data word representative of a selected lock code with said data word representative of said new code; and means for actuating the lock in response to said lock-actuating signal.

* * * * *